US006832301B2

(12) United States Patent
Bobak et al.

(10) Patent No.: US 6,832,301 B2
(45) Date of Patent: Dec. 14, 2004

(54) METHOD FOR RECOVERING MEMORY (75) Inventors: Roman A. Bobak, Wappingers Falls, NY (US); Charles E. Mari, Wappingers Falls, NY (US); Harris Morgenstern, Wappingers Falls, NY (US); Jim H. Mulder, Wappingers Falls, NY (US); Robert R. Rogers, Beacon, NY (US); Danny R. Sutherland, Poughkeepsie, NY (US); Peter B. Yocom, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 09/950,422

(22) Filed: Sep. 11, 2001

(65) Prior Publication Data

US 2003/0051189 A1 Mar. 13, 2003

(51) Int. Cl.[7] .......................... G06F 12/02; G06F 11/00
(52) U.S. Cl. ...................... 711/170; 711/161; 711/162; 711/165; 711/205; 711/206; 711/207; 714/4; 714/6
(58) Field of Search ................................ 711/176, 161, 711/162, 165, 205, 206, 207; 714/4, 6

(56) References Cited

U.S. PATENT DOCUMENTS

| 4,754,394 | A | | 6/1988 | Brantley, Jr. et al. ....... 364/200 |
| 4,945,480 | A | * | 7/1990 | Clark et al. .................... 711/6 |
| 4,979,098 | A | * | 12/1990 | Baum et al. ................. 711/208 |
| 5,220,669 | A | * | 6/1993 | Baum et al. ................. 718/108 |
| 5,371,876 | A | | 12/1994 | Ewertz et al. ............... 395/425 |
| 5,390,310 | A | * | 2/1995 | Welland ....................... 711/203 |
| 5,579,516 | A | | 11/1996 | Van Maren et al. ........ 395/601 |
| 5,581,722 | A | * | 12/1996 | Welland ....................... 711/207 |
| 5,696,926 | A | | 12/1997 | Culbert et al. ............... 395/413 |
| 5,699,539 | A | | 12/1997 | Garber et al. ............... 395/402 |
| 5,835,959 | A | | 11/1998 | McCool et al. ............. 711/171 |
| 6,016,553 | A | | 1/2000 | Schneider et al. ............ 714/21 |

OTHER PUBLICATIONS

"Accelerated Frame Replacement for Swap–In Requests," IBM Technical Disclosure Bulletin, vol. 25 No. 3B, Aug. 1982 pp. 1591–1592.
"Means for Reducing Paging Overhead," IBM Technical Disclosure Bulletin, vol. 33 No. 5, Sep. 1990 pp. 63–64.

* cited by examiner

Primary Examiner—T. N. Nguyen
(74) Attorney, Agent, or Firm—William A. Kinnaman, Jr.; Cantor Colburn LLP (57) ABSTRACT

In a computing system having swappable and non-swappable address spaces, wherein the computing system includes an operating system that includes a Real Storage Manager (RSM), a Systems Resource Manager (SRM) and a Region Control Task (RCT), a method for recovering swappable fixed non-preferred memory is provided which includes receiving a request from the operating system to configure an area of real memory to create an intercepted swappable address space, wherein the intercepted swappable address space includes a flagged fixed frame element identified for configuration, examining the intercepted swappable address space so as to determine if the intercepted swappable address space will remain swappable, requesting the SRM to coordinate the swapping process, quiescing the intercepted address space, generating a first return code responsive to the intercepted swappable address space remaining swappable, communicating the first return code to the RCT so as to cause the RCT to respond to the first return code, instructing the RSM to proceed based on the first return code, examining the intercepted swappable address space so as to identify the flagged frame elements, exchanging the flagged frame elements with unflagged frame elements, updating dynamic address translation tables, and returning a performance code to the RCT so as to indicate recovery success or recovery failure. A method for recovering swappable fixed non-preferred memory where the originally swappable address space has been converted into non-swappable address space is also provided.

34 Claims, 8 Drawing Sheets

METHOD FOR RECOVERING MEMORY

FIELD OF THE INVENTION

The present invention relates generally to a method for an operating system to reclaim or recover a subset of the resources of an address space in the case where the resources cannot be removed while the address space is active and more particularly to a more efficient method for an operating system to recover fixed real storage from a swappable address space.

BACKGROUND OF THE INVENTION

As used herein, the term 'frame' is meant to refer to a block of information, wherein the block of information may be the smallest allocatable unit of real storage.

As used herein, the term 'fixed frame' refers to a frame that cannot be taken or relocated except through the swap process.

As used herein, the term 'fixed page' refers to a virtual page backed by a fixed frame.

As used herein, the term 'secondary storage' refers to a location of a page when not residing in real memory.

As used herein, the term 'frame table element' or 'frame element' refers to the data structure representing a real frame, wherein each real frame has a frame table element.

Typically, in operating systems that support multiple virtual address spaces and that have the ability to fix certain blocks of information, or frames, in an address space in real memory for future use, the operating system is sometimes required to move fixed frames to an alternate memory location, such as a secondary memory or an expanded memory. This technique is called swapping and allows the operating system to reclaim a subset of the resource of the address space and use that subset for more immediate operations. The real memory for a page is allocated and the dynamic address translation tables for that page are updated using a process called 'backing', which indicates the real memory associated with that page.

Figure 1:
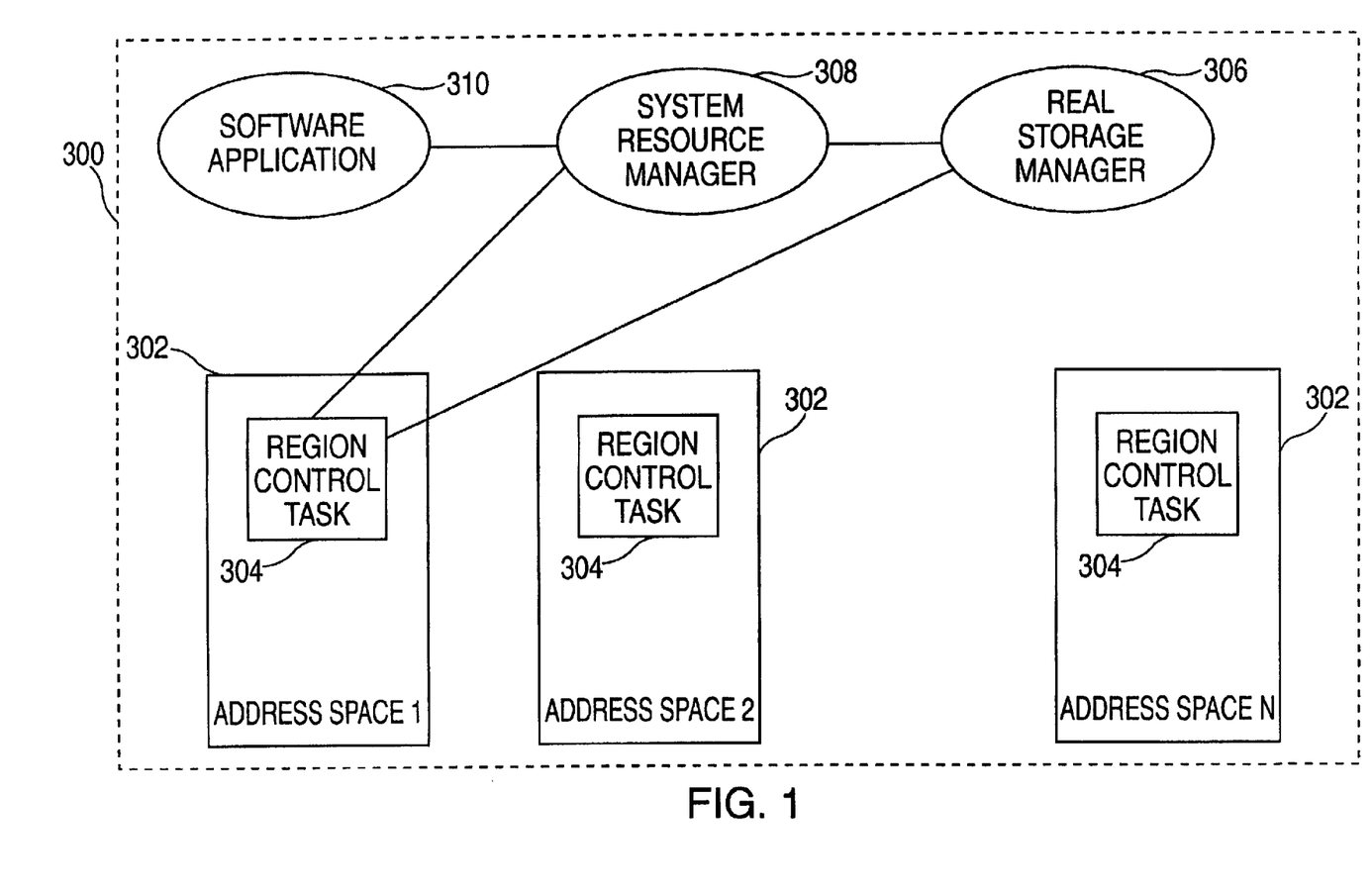
FIG. 1 is a block diagram of an operating system showing the relationship between the SRM, the RSM and the RCT.

Referring to FIG. 1, an operating system 300 is shown having multiple address spaces. Normally, each address space 302 contains a Region Control Task (RCT) 304 which controls various functions in the address space 302, including the swapping process. In addition, each operating system includes a Real Storage Manager (RSM) 306 and a Systems Resource Manager (SRM) 308 which coordinate actions between the RCT 304 and any programs or applications 310 that are active. As an example, when stored information needs to be recovered from an address space 302, the RSM 306 notifies the SRM 308 and the SRM 308 coordinates this action by communicating with the RCT 304 of the address space 302. As another example, when a swappable address space 302 is to become non-swappable, the application 310 that initiates this action notifies the SRM 308 and the SRM 308 coordinates this by communicating with the RCT 304 and requesting that a swappable address space 302 become non-swappable.

In an operating system, real memory is categorized into preferred and non-preferred memory. Non-preferred memory is memory that can be made available on demand and preferred memory is memory that may hold long term fixed pages and that cannot be made available on demand. Swappable address spaces can fix pages in the preferred or non-preferred area of real memory and non-swappable address spaces can fix pages in the preferred area of real memory. Because non-preferred memory must be made available on demand the operating system must be able to recover (i.e. retrieve memory from an application using the memory) non-preferred memory when needed for more immediate operations. Typically, non-preferred memory must be recovered because the storage is to be configured offline or the address space owning the non-preferred memory is becoming long term non-swappable and hence all of its fixed frames must become preferred. Using current swapping methods, two processes, REQSWAP and TRANSWAP, are usually employed. The REQSWAP process is utilized for recovering fixed non-preferred memory from a swappable address space and the TRANSWAP process is utilized in systems which support the capability for the conversion of a swappable address space into non-swappable address space. Both the REQSWAP process and the TRANSWAP process facilitate the swapping action and are discussed in more detail below.

Figure 2:
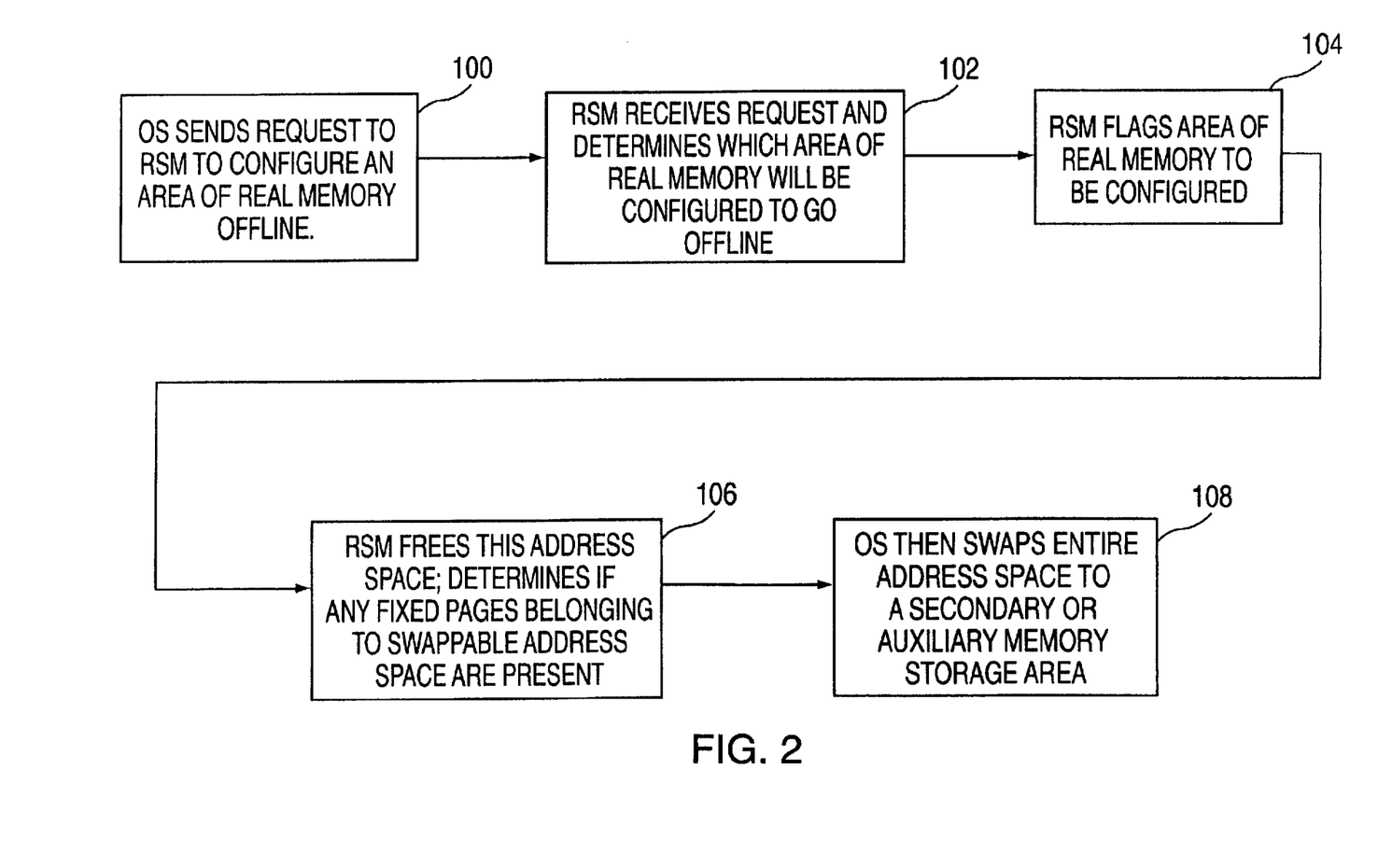
FIG. 2 is a block diagram describing the existing method for recovering non-preferred fixed frames from a swappable address space.

Referring to FIG. 2, the existing method for recovering swappable fixed non-preferred memory using the REQSWAP process is illustrated. If the operating system needs to configure a specific area of real memory, then the operating system sends a request to the Real Storage Manager (RSM) to configure an area of real memory offline as in step 100. The RSM receives this request and determines which area of real memory will be configured as in step 102. The RSM then indicates that this area of real memory has been 'intercepted' or 'flagged' to go offline as in step 104. The RSM then determines if there are any fixed pages belonging to swappable address spaces contained within the range of real storage as in step 106. If so, the operating system then swaps the entire address space to a secondary, or auxiliary storage, then back into real memory as in step 108. This process of swapping the address space to an auxiliary storage will free the memory, thus allowing the 'flagged' frames to be available and thus configured offline.

One problem with this process is that every address space that contains fixed intercepted frames is swapped into a secondary memory storage or an external memory storage area which requires the need to perform Input/Output (I/O) operations. These I/O operations can be expensive in both time and cost.

Figure 3:
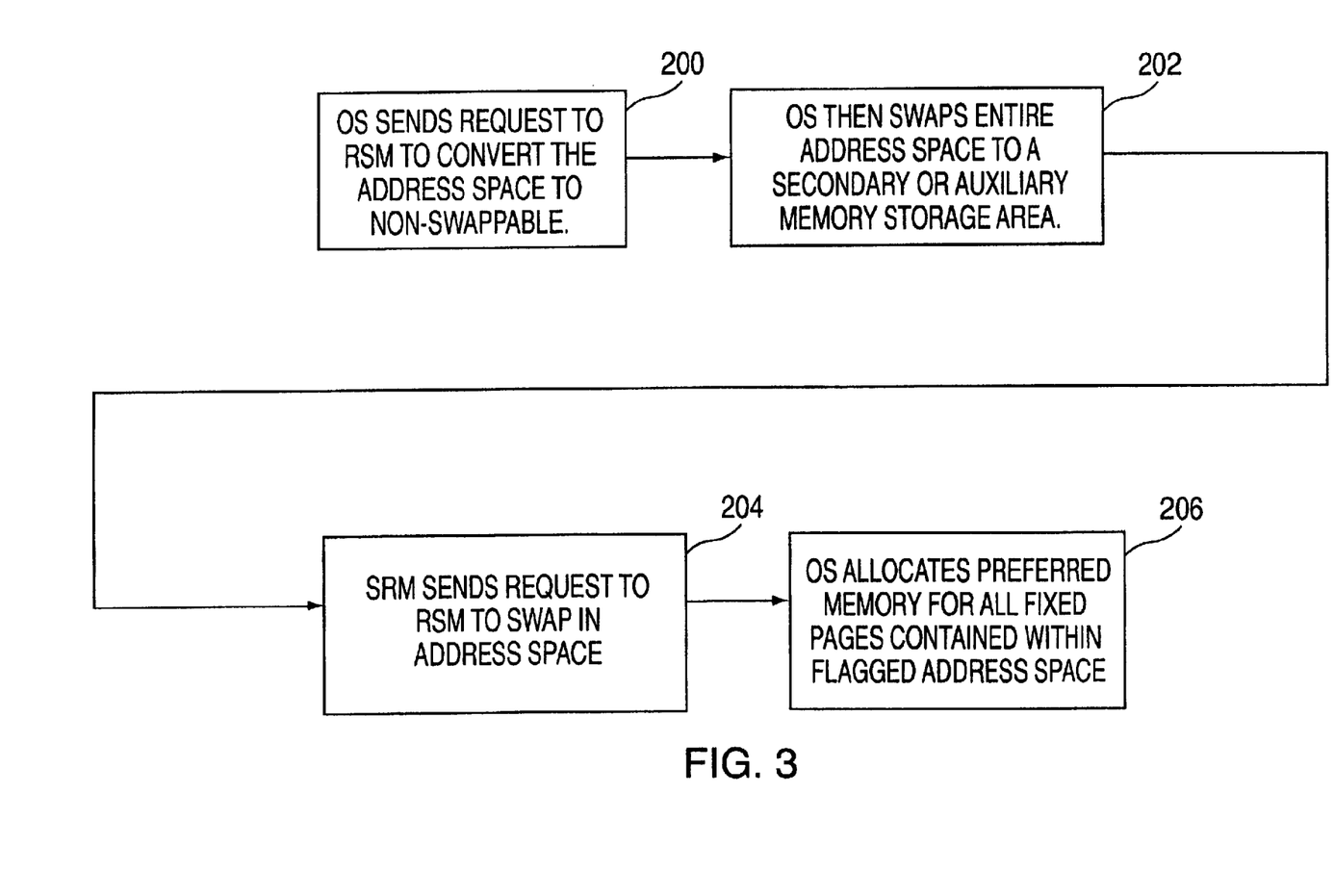
FIG. 3 is a block diagram describing the existing method for recovering swappable fixed non-preferred memory where the originally swappable address space has been converted into non-swappable address space.

Referring to FIG. 3, the existing method for recovering swappable fixed non-preferred memory where the originally swappable address space has been converted into non-swappable address space using the TRANSWAP process is illustrated. The operating system sends a request to the RSM to convert the address space with intercepted frames to non-swappable address space as in step 200. The operating system then swaps the entire address space to a secondary or auxiliary memory storage area as in step 202. The SRM will then send a request to the RSM to swap in the address space as in step 204. In swapping the address space back into real memory, the operating system will detect that the address space is now non-swappable and will allocate preferred memory for all fixed pages with the address space as in step 206. The entire address space is swapped which is a time consuming and expensive process.

Currently, the only method for recovering fixed non-preferred frames is to swap the entire owning address space to secondary storage. However, two problems exist with these methods. First, in an operating system that doesn't support expanded storage (such as an electronic volatile storage comparable to real storage), all swapped non-preferred memory is required to be relocated to a secondary or auxiliary memory location. This is undesirable because a swap out to a secondary or auxiliary storage location is much more expensive than a swap out to an expanded storage location. Second, all of the frames in the address space must be processed in order to perform the swap even though only a subset of the frames actually need to be replaced. In effect, the way the REQSWAP and TRANSWAP processes perform their tasks is inherently costly and inefficient. Thus, it is desirable to provide a method which is capable of performing the tasks of REQSWAP and TRANSWAP, yet that is more efficient and less expensive to implement.

Therefore, the need remains for a method of recovering fixed non-preferred memory whereby the method is more efficient and less expensive to implement than current swapping methods.

SUMMARY OF THE INVENTION

In a computing system having swappable and non-swappable address spaces, wherein the computing system includes an operating system that includes a Real Storage Manager (RSM), a Systems Resource Manager (SRM) and a Region Control Task (RCT), a method for recovering swappable fixed non-preferred memory comprising: receiving a request from the operating system to configure an area of real memory to create an intercepted swappable address space, wherein the intercepted swappable address space includes a flagged fixed frame element identified for configuration; examining the intercepted swappable address space so as to determine if the intercepted swappable address space will remain swappable; requesting the SRM to coordinate the swapping process; quiescing the intercepted address space; generating a first return code responsive to the intercepted swappable address space remaining swappable; communicating the first return code to the RCT so as to cause the RCT to respond to the first return code; instructing the RSM to proceed based on the first return code; examining the intercepted swappable address space so as to identify the flagged-frame elements; exchanging the flagged frame elements with unflagged frame elements; updating dynamic address translation tables; and returning a performance code to the RCT so as to indicate recovery success or recovery failure.

In a computing system having swappable and non-swappable address space, wherein the computing system includes an operating system that includes a Real Storage Manager (RSM), a Systems Resource Manager (SRM) and a Region Control Task (RCT) and wherein the SRM has been requested to coordinate swapping an address space having a non-preferred frame backing a fixed page, a method for recovering swappable fixed non-preferred memory where the originally swappable address space has been converted into non-swappable address space comprising: quiescing the address space; generating a second return code responsive to the address space being converted into the non-swappable address space; communicating the second return code to the RCT so as to cause the RCT to respond to the second return code; instructing the RSM to proceed based on the second return code; examining the address space so as to identify the non-preferred frame backing the fixed page; exchanging the non-preferred frame backing the fixed page with a new frame; updating dynamic address translation tables; and returning a performance code to the RCT so as to indicate recovery success or recovery failure.

DETAILED DESCRIPTION OF THE INVENTION

An exemplary embodiment is described herein by way of illustration as may be applied to an operating system that supports multiple virtual address spaces and that have the ability to fix or reserve certain blocks of information in an address space for future use. While a preferred embodiment is shown and described, it will be appreciated by those skilled in the art that the invention is not limited to the embodiment and application described herein, but also to any operating system that supports multiple virtual address spaces and that have the ability to fix or reserve certain blocks of information in an address space for future use. Those skilled in the art will appreciate that a variety of potential implementations and configurations are possible within the scope of the disclosed embodiments.

In accordance with an embodiment of the invention, a more efficient method of accomplishing the existing REQSWAP and TRANSWAP processes as described hereinabove is provided by dealing only with the frames that are affected by the existing REQSWAP or TRANSWAP processes and by bypassing the need to perform I/O functions to secondary, or auxiliary, storage. This invention provides an advantage over existing methods by allocating a new real memory frame only for each affected frame, copying the data for the affected page into the new real memory frame, backing the page with the new frame and freeing the frame no longer being used to back the page. The method of this invention is described below.

Figure 4:
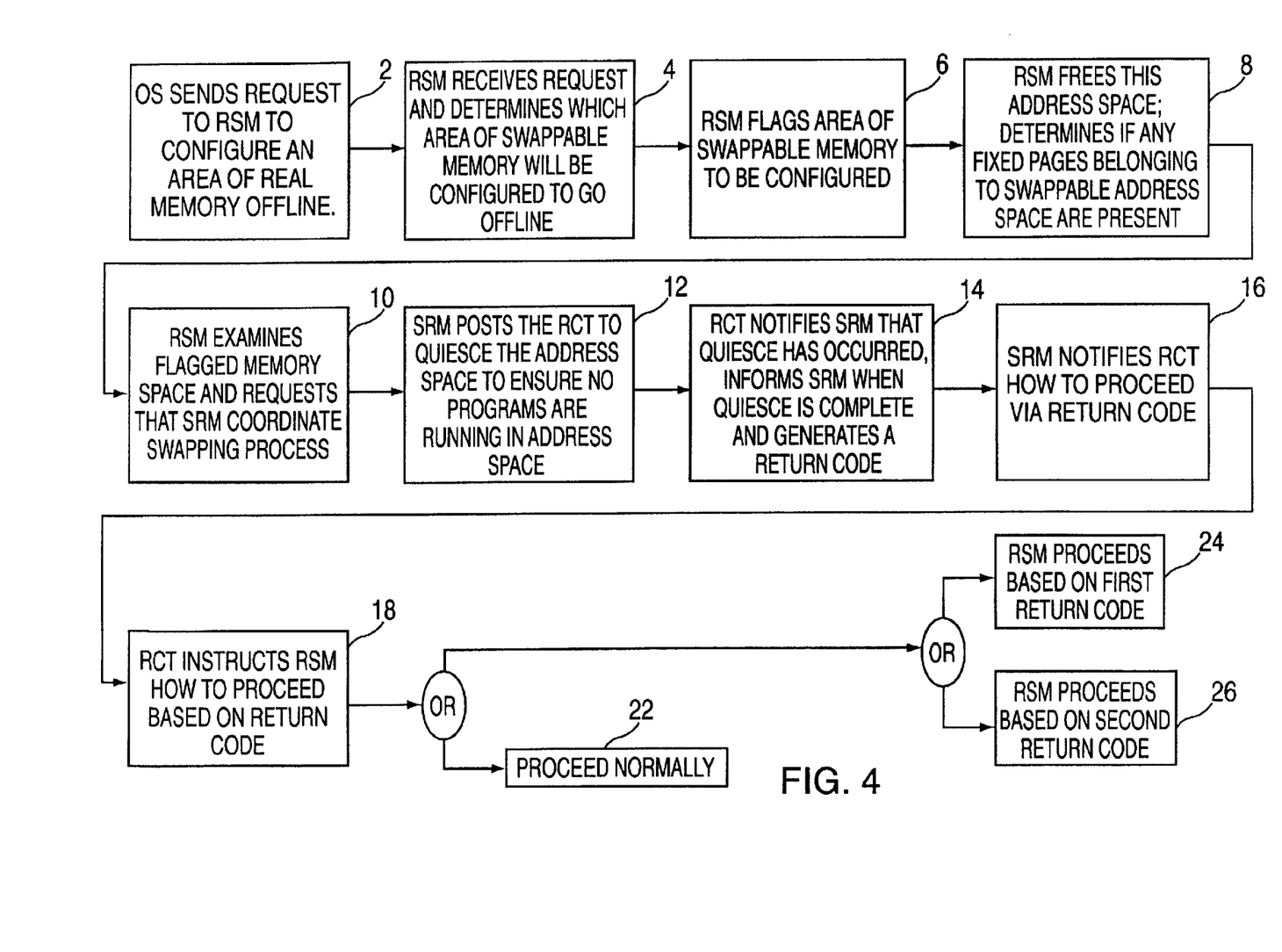
FIG. 4 is a high level block diagram describing a method for recovering fixed non-preferred memory in an operating system in accordance with an embodiment of the invention.

Referring to the drawings, FIG. 4 illustrates a method for recovering fixed non-preferred memory in an operating system. In accordance with an embodiment of the invention, when a computer system which employs an operating system wants to recover or reclaim fixed real storage, the computer operating system instructs, or requests, the RSM to configure an area of real memory offline as shown in step 2. The RSM receives the request and determines which area of real memory will be configured to go offline as shown in step 4. The RSM then 'intercepts' or 'flags' this area of real memory to go offline as shown in step 6. This 'flag' informs the operating system and other applications that this memory block is reserved for future use. The RSM then frees the intercepted block of memory and determines if any of the fixed pages contained within the intercepted block of memory 'belongs' to swappable address space as shown in step 8. If the intercepted block of memory contains fixed frames which belong to swappable address space then the fixed pages can either be relocated to an auxiliary storage, or exchanged in real memory, with the operating system allocating and backing a page with non-intercepted memory. If the frame backs a fixed page, then the address space needs to be swapped to make that frame available to go offline.

In accordance with an embodiment of the invention, the RSM examines the area of memory being configured and determines if any fixed frames exist in the examined area of memory. If so, the RSM requests that the System Resource Manager (SRM) coordinate the address space swapping process for each address space that owns fixed frames in the examined area, as shown in step 10. Once the SRM has been requested to coordinate the swapping process, the SRM posts the Region Control Task (RCT) to quiesce the intercepted address space as shown in step 12. This ensures that no programs are or will attempt to run in this address space. The RCT will then inform the SRM when the quiesce has occurred and when the quiesce has been completed, as shown in step 14. Also as shown in step 14, if the intercepted address space is to remain swappable, and if the operating system wants to recover the fixed non-preferred memory, then the SRM will generate a first return code. However, if the operating system wants to recover fixed non-preferred memory where the originally swappable address space has been converted into non-swappable address space, then the SRM will generate a second return code.

The SRM will then inform the RCT on how to proceed by communicating to the RCT the generated return code, as shown in step 16. In accordance with an embodiment of the invention, once the RCT receives the return code from the SRM, the RCT will communicate the return code to the RSM which will instruct the RSM to proceed in a predetermined manner based on the return code, as shown in step 18. As described above, this return code is based on what actions the system wants to perform next.

Figure 5A:
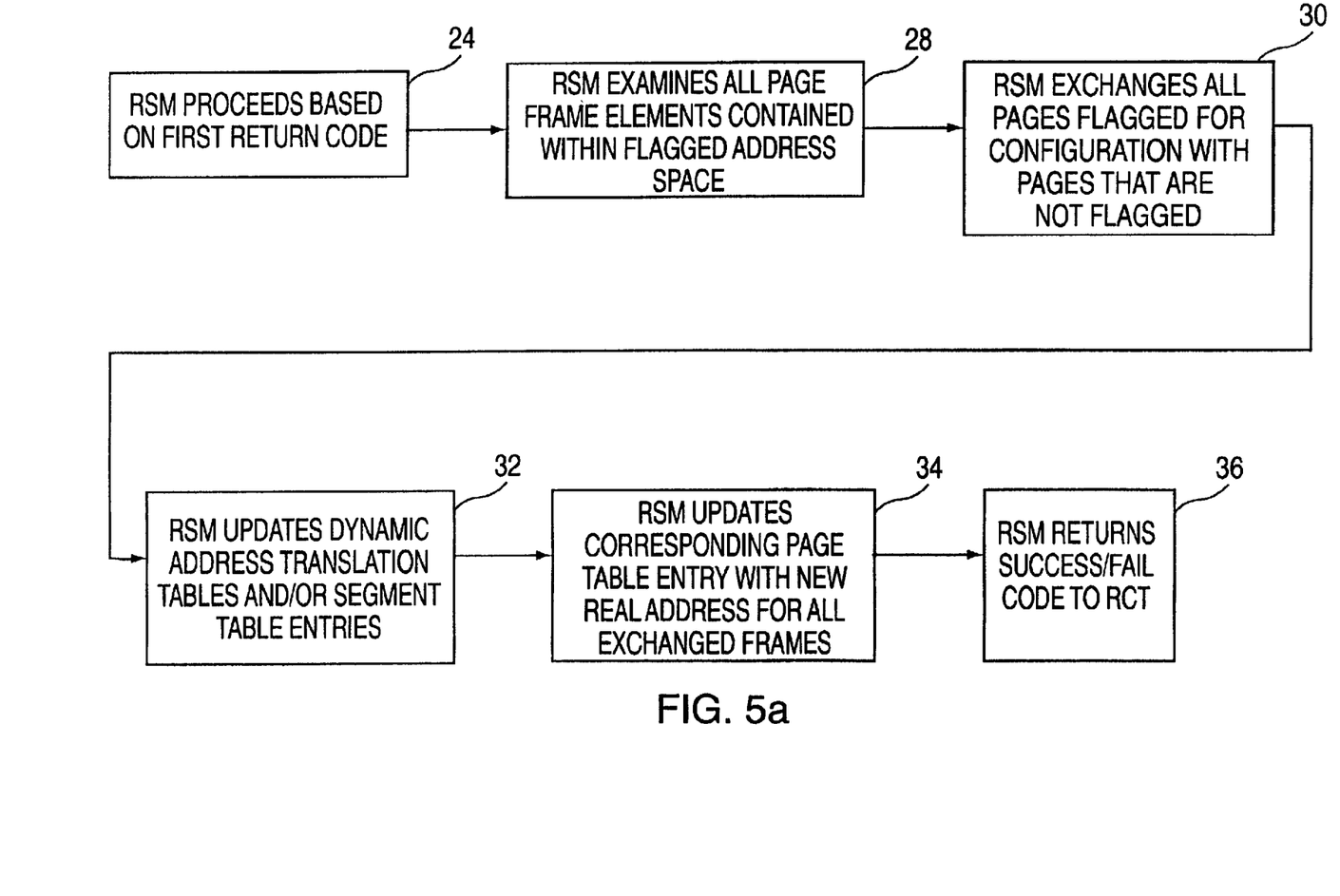
FIG. 5a shows a block diagram describing a method for recovering swappable fixed non-preferred memory in an operating system in accordance with an embodiment of the invention.
Figure 5B:
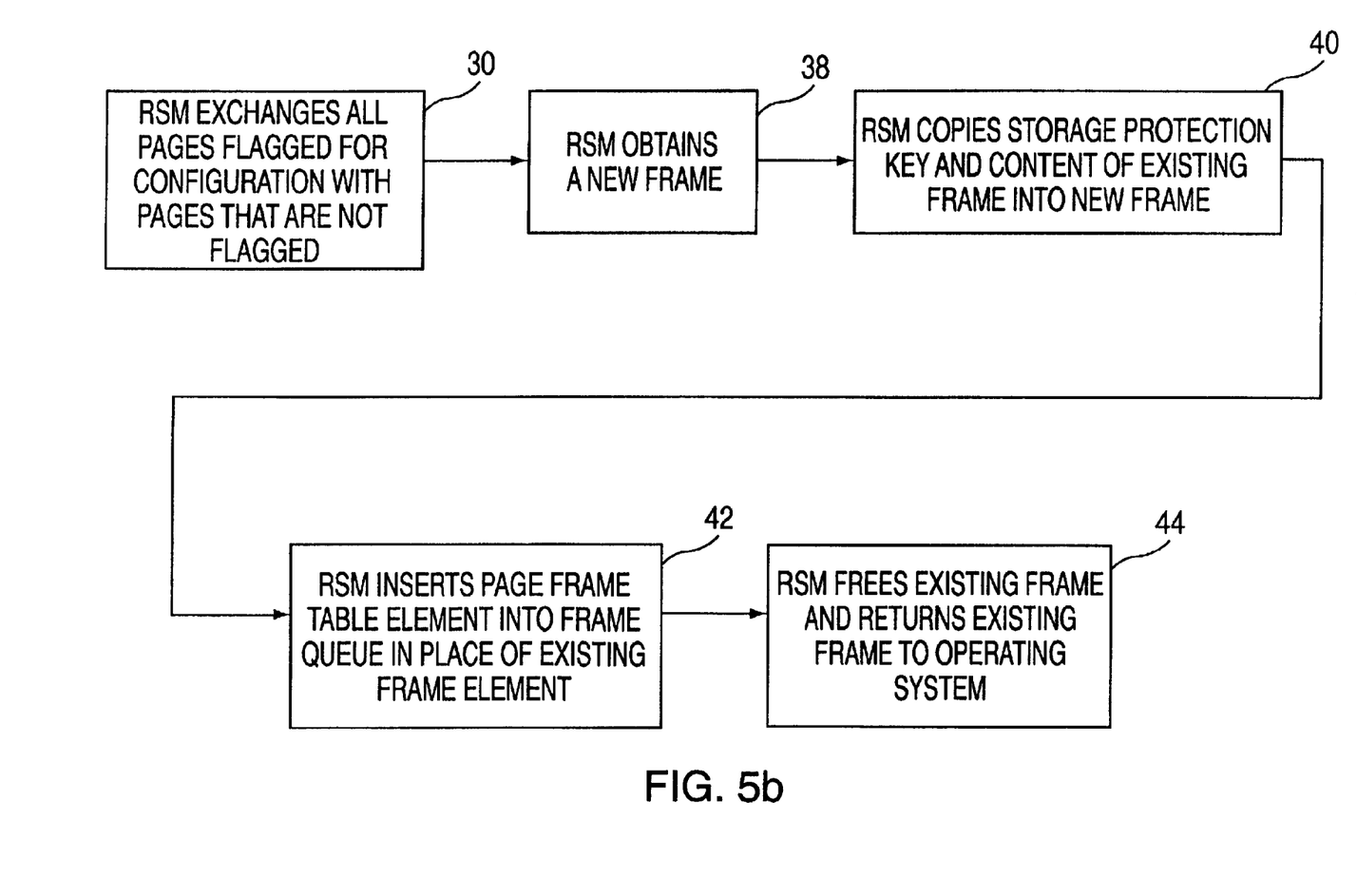
FIG. 5b shows a block diagram describing a sub-element of a method for recovering swappable fixed non-preferred memory in an operating system in accordance with an embodiment of the invention.

Referring to FIG. 4, FIG. 5a and FIG. 5b, once the operating system determines that it wants to recover intercepted real storage, then the return code will instruct the RCT to proceed in the manner prescribed by the first return code as shown in step 24. In accordance with an embodiment of the invention, the RSM will examine all frame elements assigned to the address space, as shown in step 28. The RSM will exchange all frames flagged for configuration with frames that are not flagged for configuration as shown in step 30. The RSM does this by obtaining a new frame, as shown in step 38. The RSM then copies the content of the existing frame into the new frame, as shown in step 40. Also as shown in step 40, the storage protection key, which controls access to the frame, is copied from the existing frame into the new frame. In accordance with an embodiment of the invention, the RSM then inserts the new frame table element into the frame queue in place of the existing frame element, as in step 42. This identifies to the operating system that the information contained within the frame flagged for configuration now exists at a new memory address, namely that of the newly obtained frame. Once this is completed, the RSM frees the existing, or flagged, frame and returns the existing frame back to the operating system, as shown in step 44.

In accordance with an embodiment of the invention, the RSM updates the appropriate dynamic address translation table entries to reflect the new real storage location of the exchanged frame, as in step 32. Also, as in step 32, if the exchanged frame is a page table, then the address of the corresponding segment table entry is calculated and updated with the new memory address of the page table. The RSM then updates the corresponding page table entry with the new real memory address for all exchanged frames, as in step 34. As shown in step 36, once all of the frame queues of the real address space have been processed and all of the intercepted, or flagged, frames are replaced with non-intercepted, or non-flagged, frames, processing is complete and the RSM will generate and return a performance code. If the recovery was a success then the RSM will return a successful performance code to the RCT. However, if the RSM is unable to replace all of the intercepted frames with non-intercepted frames, the RSM will return a failing performance code to the RCT and the RCT will initiate a swap to secondary storage for the intercepted addess space.

Figure 6A:
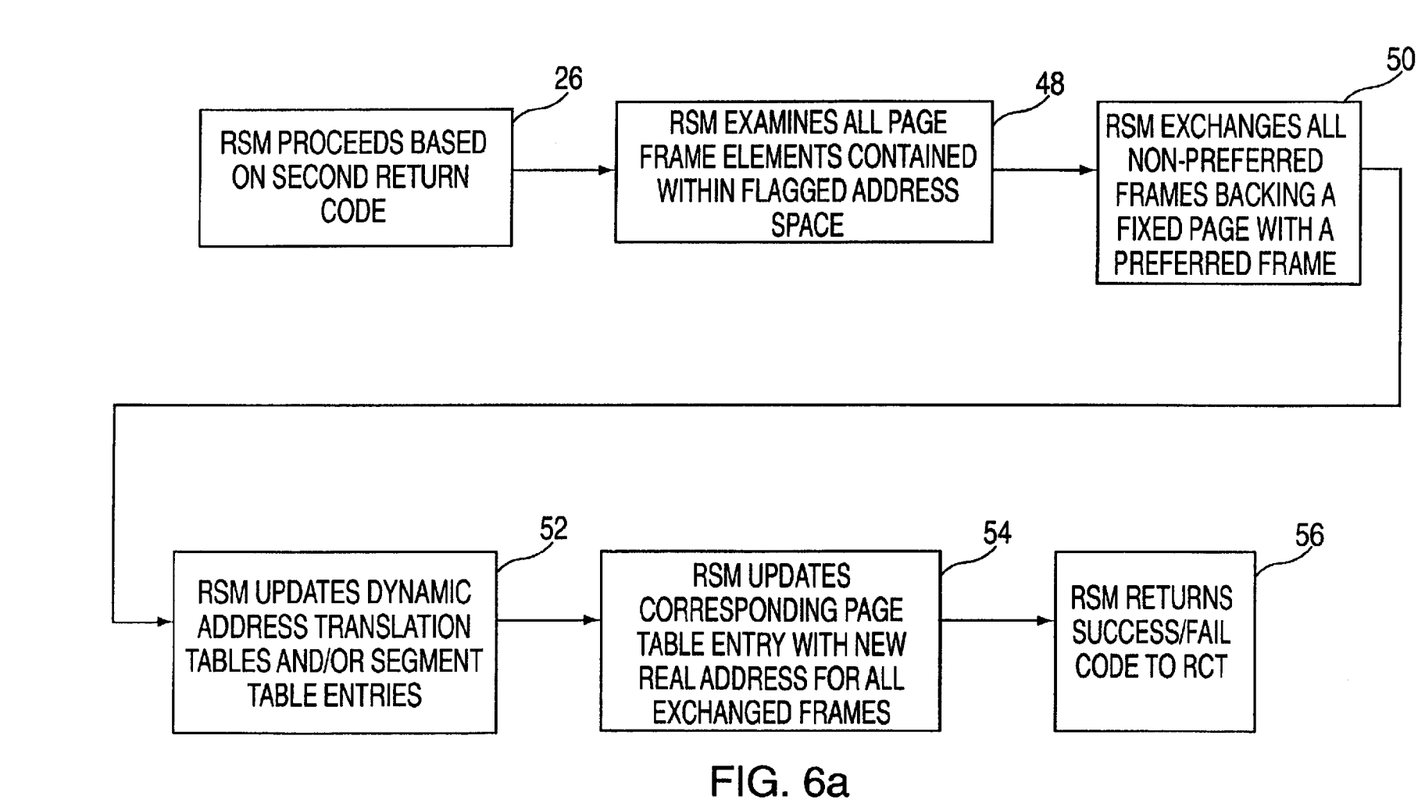
FIG. 6a shows a block diagram describing a method for recovering swappable fixed non-preferred memory where the originally swappable address space has been converted into non-swappable address space in accordance with an embodiment of the invention.
Figure 6B:
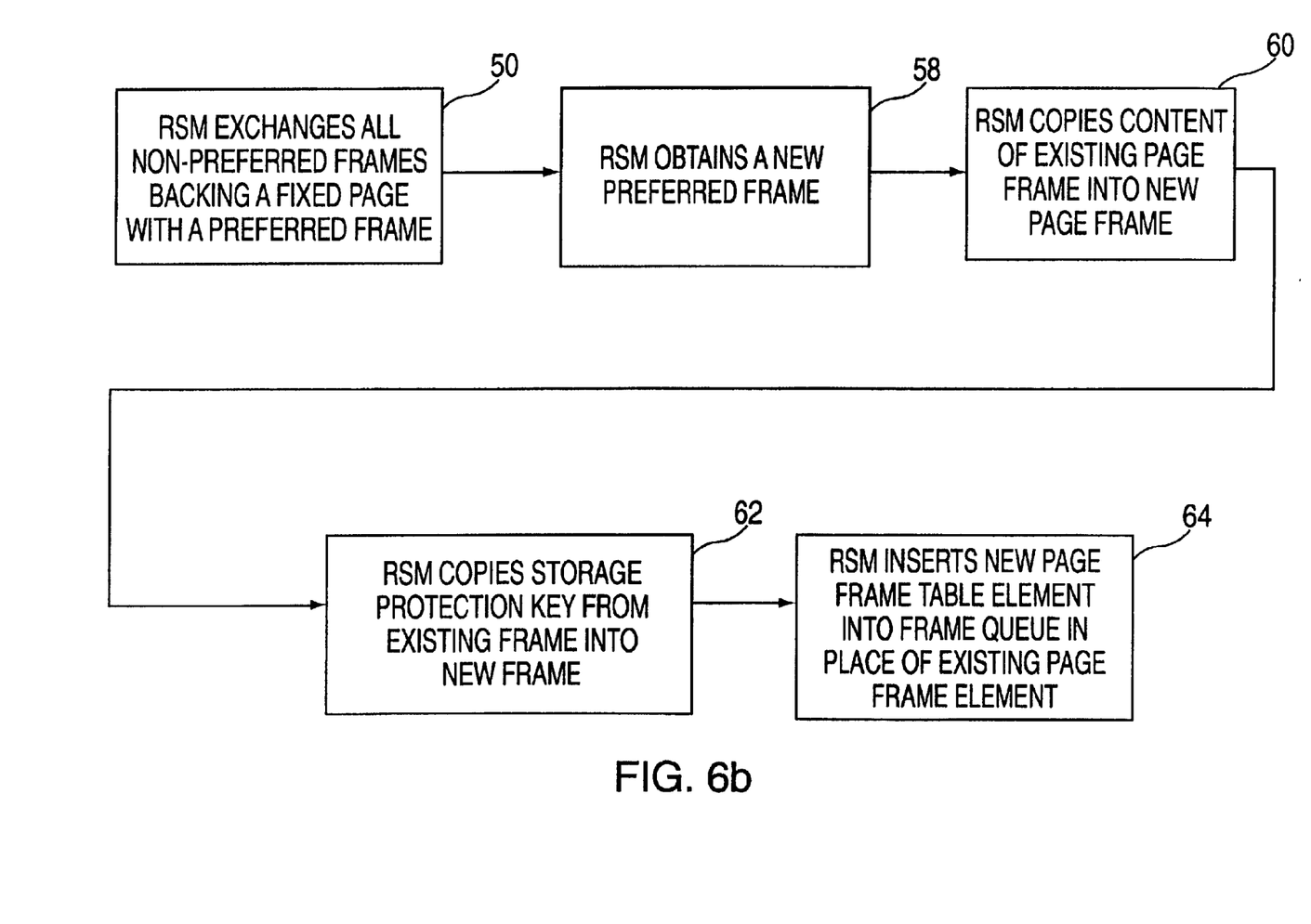
FIG. 6b shows a block diagram describing a sub-element of a method for recovering swappable fixed non-preferred memory where the originally swappable address space has been converted into non-swappable address space in accordance with an embodiment of the invention.

Referring to FIG. 4, FIG. 6a and FIG. 6b, once the operating system determines that it wants to recover fixed non-preferred memory where the original address space has been converted into non-swappable address space, then the return code will instruct the RCT to proceed in the manner prescribed by the second return code, as shown in step 26. In accordance with an embodiment of the invention, the RSM will examine all frame elements on the various frame queues for the flagged real address space to determine if there are any non-preferred frames backing fixed pages, as in step 48. If there are, then the RSM exchanges all non-preferred frames backing a fixed page with a preferred frame, as in step 50. The RSM does this by obtaining a new preferred frame, as shown in step 58. The RSM then copies the content of the existing frame into the new frame, as shown in step 60. Then, as shown in step 62, the storage protection key, which controls access to the frame, is copied from the existing frame into the new frame. In accordance with an embodiment of the invention, the RSM then inserts the new frame table element into the frame queue in place of the existing frame element, as in step 64. This identifies to the operating system that the information contained within the frame flagged for configuration now exists at a new real address, namely that of the newly obtained frame. Once this is completed, the RSM frees the existing, or flagged, frame and returns the existing frame back to the operating system.

In accordance with an embodiment of the invention, the RSM updates the appropriate dynamic address translation table entries to reflect the new real storage location of the exchanged frame, as in step 52. Also, as in step 52, if the exchanged frame is a page table, then the address of the corresponding segment table entry is calculated and updated with the new real address of the page table. The RSM then updates the corresponding page table entry with the new real address for all exchanged frames, as in step 54. As shown in step 56, once all of the frame queues of the real address space have been processed and all of the non-preferred frames backing fixed pages are replaced with preferred frames, processing is complete and the RSM returns a successful performance code to the RCT. If the RSM is unable to replace all non-preferred frames backing fixed pages with preferred frames, the RSM returns a failing performance code to the RCT and the RCT will initiate a swap to secondary storage for the intercepted addess space.

In accordance with an embodiment of the invention, the performance code described above is not limited only to success or failure indication. It is considered within the scope of the present invention that the performance code as described above may indicate any information desired and suitable to the desired end purpose.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a computing system having swappable and non-swappable address spaces, wherein said computing system includes an operating system that includes a Real Storage Manager (RSM), a Systems Resource Manager (SRM) and a Region Control Task (RCT), a method for recovering swappable fixed non-preferred memory comprising:

receiving a request from said operating system to configure an area of real memory to create an intercepted swappable address space, wherein said intercepted swappable address space includes a flagged fixed frame element identified for configuration;

examining said intercepted swappable address space so as to determine if said intercepted swappable address space will remain swappable;

requesting said SRM to coordinate said swapping process;

quiescing said intercepted address space;

generating a first return code responsive to said intercepted swappable address space remaining swappable;

communicating said first return code to said RCT so as to cause said RCT to respond to said first return code;

instructing said RSM to proceed based on said first return code;

examining said intercepted swappable address space so as to identify said flagged-frame elements;

exchanging said flagged frame elements with unflagged frame elements;

updating dynamic address translation tables; and returning a performance code to said RCT so as to indicate recovery success or recovery failure.

2. The method according to claim 1, wherein said receiving a request from said operating system includes said RSM receiving said swapping process request from said operating system.

3. The method according to claim 1, wherein said receiving a request from said operating system includes said RSM determining which area of said swappable memory will be configured so as to create said intercepted swappable address space.

4. The method according to claim 1, wherein said receiving a request from said operating system includes freeing said intercepted swappable address space so as to reserve said intercepted swappable address space for future use.

5. The method according to claim 1, wherein said receiving a request from said operating system includes determining if said flagged frame elements belong to said intercepted swappable address space.

6. The method according to claim 1, wherein said quiescing said intercepted address space includes said SRM requesting said RCT to quiesce said intercepted address space so as to ensure that no programs are running in said intercepted address space.

7. The method according to claim 1, wherein said quiescing said intercepted address space includes said RCT informing said SRM that quiescing of said intercepted address space has occurred.

8. The method according to claim 1, wherein said quiescing said intercepted address space includes said RCT informing said SRM that quiescing of said intercepted address space has been completed.

9. The method according to claim 1, wherein said generating a first return code includes said SRM generating said first return code.

10. The method according to claim 1, wherein said communicating said first return code to said RCT includes said SRM communicating said first return code to said RCT.

11. The method according to claim 1, wherein said instructing said RSM includes said RCT communicating said first return code to said RSM.

12. The method according to claim 1, wherein said instructing said RSM includes RSM proceeding based on said first return code.

13. The method according to claim 1, wherein said exchanging said flagged frame elements includes said RSM obtaining a new frame, wherein said flagged frame includes flagged frame content, a flagged frame table element and a storage protection key and said new frame includes a new frame table element.

14. The method according to claim 13, wherein said exchanging said flagged frame elements includes said RSM copying said flagged frame content and said storage protection key into said new frame.

15. The method according to claim 13, wherein said exchanging said flagged frame elements includes said RSM inserting said new frame table element into the frame queue in place of said flagged frame table element.

16. The method according to claim 13, wherein said exchanging said flagged frame elements includes said RSM freeing said flagged frame element and returning said flagged frame element to said operating system.

17. The method according to claim 13, wherein said exchanging said flagged frame elements includes said RSM detecting that said flagged frame element has been freed.

18. The method according to claim 13, wherein said updating dynamic address translation tables includes updating said dynamic address translation tables to reflect the new storage location of said new frame.

19. The method according to claim 1, wherein said returning a performance code includes generating a successful performance code, wherein said successful performance code is responsive to the success of said swapping process.

20. The method according to claim 1, wherein said returning a performance code includes generating a failing performance code, wherein said failing performance code is responsive to the failure of said swapping process so as to cause said RCT to initiate said swapping process to secondary storage for said intercepted address space.

21. In a computing system having swappable and non-swappable address space, wherein said computing system includes an operating system that includes a Real Storage Manager (RSM), a Systems Resource Manager (SRM) and a Region Control Task (RCT) and wherein said SRM has been requested to coordinate swapping an address space having a non-preferred frame backing a fixed page, a method for recovering swappable fixed non-preferred memory where the originally swappable address space has been converted into non-swappable address space comprising:

quiescing said address space;

generating a second return code responsive to said address space being converted into said non-swappable address space;

communicating said second return code to said RCT so as to cause said RCT to respond to said second return code;

instructing said RSM to proceed based on said second return code;

examining said address space so as to identify said non-preferred frame backing said fixed page;

exchanging said non-preferred frame backing said fixed page with a new frame;

updating dynamic address translation tables; and returning a performance code to said RCT so as to indicate recovery success or recovery failure.

22. The method according to claim 21, wherein said quiescing said address space includes said SRM requesting said RCT to quiesce said address space so as to ensure that no programs are running in said address space.

23. The method according to claim 21, wherein said quiescing said address space includes said RCT informing said SRM that quiescing of said address space has occurred.

24. The method according to claim 21, wherein said quiescing said address space includes said RCT informing said SRM that quiescing of said address space has been completed.

25. The method according to claim 21, wherein said generating a second return code includes said SRM generating said second return code.

26. The method according to claim 21, wherein said communicating said second return code to said RCT includes said SRM communicating said second return code to said RCT.

27. The method according to claim 21, wherein said instructing said RSM includes said RCT communicating said second return code to said RSM.

28. The method according to claim 21, wherein said instructing said RSM includes RSM proceeding based on said second return code.

29. The method according to claim 21, wherein said exchanging said non-preferred frame includes said RSM obtaining said new frame, wherein said new frame is a new preferred frame and wherein said non-preferred frame includes non-preferred frame content, a non-preferred frame table element and a storage protection key and said new preferred frame includes a new frame table element.

30. The method according to claim 29, wherein said exchanging said non-preferred-frame includes said RSM copying said non-preferred frame content and said storage protection key into said new preferred frame.

31. The method according to claim 29, wherein said exchanging said non-preferred frame includes said RSM inserting said new frame table element into the frame queue in place of said non-preferred frame table element.

32. The method according to claim 29, wherein said updating dynamic address translation tables includes updating said dynamic address translation tables to reflect the new storage location of said new preferred frame.

33. The method according to claim 21, wherein said returning a performance code includes generating a successful performance code, wherein said performance code is responsive to the success of said swapping an address space.

34. The method according to claim 21, wherein said returning a performance code includes generating a failing performance code, wherein said failing performance code is responsive to the failure of said swapping an address space so as to cause said RCT to initiate said swapping process to secondary storage for said address space.

* * * * *